Aug. 27, 1957 G. A. LYON 2,804,348
WHEEL COVER
Original Filed Aug. 20, 1948
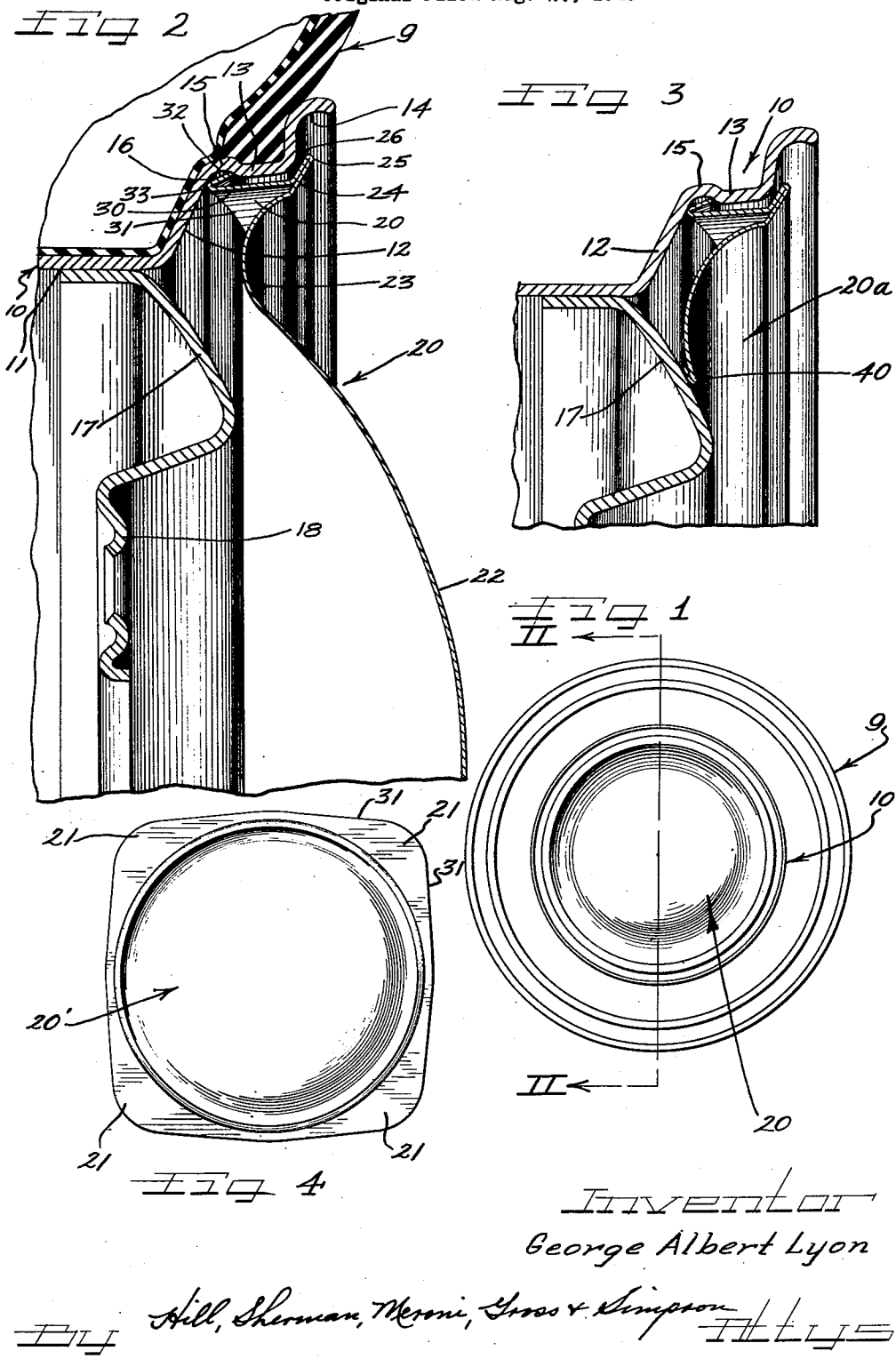

United States Patent Office 2,804,348
Patented Aug. 27, 1957

2,804,348

WHEEL COVER

George Albert Lyon, Detroit, Mich.

Original application August 20, 1948, Serial No. 45,323. Divided and this application October 12, 1953, Serial No. 385,474

4 Claims. (Cl. 301—37)

This invention relates to a wheel cover and more particularly a wheel cover embodying, as integral components thereof, retaining means for detachably holding the cover on a wheel.

An object of this invention is to provide a simple form of wheel cover with retaining means which lends itself to economical manufacture from a metallic sheet stamping on a large production basis.

Another object of this invention is to provide improved reinforced and backed-up cover retaining means for a cover.

The present subject matter has been divided from my co-pending patent application (Figures 8 and 9), Serial No. 45,323, filed August 20, 1948, now abandoned.

In accordance with the general features of this invention, there is provided in a wheel structure including a wheel having a multi-flanged tire rim, a wheel cover comprising a circular member having a turned peripheral cover pry-off edge and having projecting generally axially rearwardly from the edge at a plurality of circumferentially spaced corners flanged angular sections, each of which includes an axial leg and a relatively shorter inclined leg at an acute angle to the axial leg and extending generally radially outwardly over the axial leg and terminating in a rim flange gripping edge, the legs having a rearward junction comprising a reinforcing bend for bottoming against another rim flange.

Other objects and features of this invention may more fully appear from the following detailed description taken in connection with the accompanying drawings which illustrate a single embodiment thereof and in which—

Figure 1 is a side elevation of a wheel structure having my novel cover applied thereto;

Figure 2 is an enlarged fragmentary cross-sectional view taken on substantially the line II—II of Figure 1 looking in the direction indicated by the arrows;

Figure 3 is a cross-sectional view similar to Figure 2 showing a modified form of cover wherein the cover is in the form of an annulus or ring instead of in the form of a full disk as in Figure 2; and Figure 4 is a side view illustrating a blank or stamping from which the cover shown in Figure 2 is formed.

As shown on the drawings:

In the accompanying drawings there is illustrated a more or less conventional type of wheel and tire assembly such as is used quite extensively at the present time in the automotive industry. The reference character 9 designates generally a conventional tire and tube assembly mounted in the usual way upon a multi-flanged drop-center type of tire rim 10. This rim 10, as is well known, includes a base flange 11, a generally radial flange 12, a generally axial flange 13, and a terminal flange 14. Adjacent the junction of the radial and axial flanges 12 and 13 is a so-called safety tire retaining rim 15 which defines a groove 16 in the axial flange 13 and which I propose to make use of in the retention of my novel wheel cover.

Suitably secured to the base flange 11 is a wheel supporting member or body comprising a dished stamping 17 having a centrally inset wheel bolt mounting flange 18 by which the wheel is detachably fastened in the usual way on an axle of a vehicle.

Cooperable with this wheel assembly is a cover embodying the features of this invention which preferably comprises a metallic stamping and is designated generally by the reference character 20. This cover 20 may be formed from a stamping such as the stamping 20' shown in Figure 4 and which has four corners 21 spaced circumferentially about the stamping 20'. I propose to utilize these corners for the purpose of serving as cover retaining means.

Referring now again to Figure 2, it will be observed that the cover 20 is in the form of a full wheel disc and includes a central crown or hub portion 22, an intermediate annular dished portion 23 and a flanged outer portion 24 in divergent relation to the central crown portion 22.

The flanged portion or margin 24 terminates in a turned edge 25 which leads into an underturned flange 26 flattened against the rear side of marginal portion 24. The two portions 24 and 26 thus provide the outer periphery of the cover with a multi-thickness of metal and reinforce the edge 25 so that the edge can be used as a pry-off edge in the removal of the cover from the wheel. It will be noted that this flanged pry-off edge 25 is spaced from the junction of the two rim flanges 13 and 14. In fact, the entire wheel cover 20 is so formed as to be floatingly carried by the wheel in spaced relation therewith with the exception of the contact of its retaining means, to be hereinafter described, with the flanged rim.

The rear peripheral flange portion 26 of the cover leads into the four corners 21 of the blank from which corners cover retaining means or spring fingers are formed. Each of these spring fingers includes a generally axially extending leg 30 having inclined side edges 31. Turned back upon each axial leg 30 is a relatively short stiff angular leg 32 having a gripping edge adapted to engage the grooved surface of rib 15 in the rim. It will also be noted that when the cover is on the wheel the junction of the two legs 30 and 32, designated by the reference character 33, is adapted to bottom on the radial flange 12 of the rim so as to limit inward movement of the cover.

It will be noted that the gripping edges of the short legs 32 are normally arranged in a circle of a diameter slightly larger than that of the inner surface of rim flange 13 so that the fingers comprising the corners are resiliently deflected radially inwardly upon camming engagement with the rim flange 13. When the short angular leg 32 reaches the groove of bead rim 15, the edge of the leg resiliently moves outwardly into gripping engagement with the groove surface of rib 15. At the same time, this gripping contact is reinforced by the bottoming of rear turned edge 33 of the two legs 30 and 32 against the rim flange 12.

The form of invention shown in Figure 3 is identical to that disclosed in Figure 2 with the exception that the cover 20a is in the form of an annulus and, in addition, has an inner turned edge 40 adapted to bottom against the wheel body part 17 when the cover is on the wheel.

In both forms of the invention, the cover is applied by first aligning its finger legs 32 with the opening in the rim flange 13 and by thereafter pressing the cover axially into the wheel until it is bottomed against the wheel in tight gripping engagement with the radially inner surface of rim bead rib 15. The bottoming of the spring finger or leg 32 against the wheel rim flange 12 results in a reinforcing and backing-up of the gripping engagement of the finger leg 32 against the flange 13.

Either form of the cover may be easily removed from the wheel by inserting the edge of a pry-off tool under the outer edge of the cover to forcibly eject the retaining finger leg 32 out of the gripping engagement with the rim flange 13.

Both forms of cover may be economically made from sheet metal, such, for example, as stainless steel sheet which lends itself to a high lustrous finish with a simple buffing operation.

It will also be noted that in both forms of the cover the cover is of dished or convex curvature adjacent the rearwardly projecting angular corners 21 comprising the cover retaining means. This not only provides a very desirable appearance for the cover, but, in addition, reinforces the cover adjacent the area of resilient and pry-off stress.

I claim as my invention:

1. In a wheel structure including a wheel having a multi-flanged tire rim, a wheel cover comprising a circular member made from an originally angularly shaped sheet metal blank and having a turned peripheral cover pry-off edge, the cover having projecting generally axially rearwardly from said edge at the plurality of original circumferentially spaced corners of the blank flanged angular sections, each of which includes an axial leg with substantially flaring side edges and a relatively shorter and narrower inclined leg at an acute angle to said axial leg and extending generally radially outwardly over said axial leg and terminating in a rim flange gripping edge, said legs having a rearward junction comprising a reinforcing bend for bottoming against another rim flange.

2. In a wheel structure including a wheel body and a multi-flanged tire rim having an intermediate generally axially outwardly extending and radially inwardly facing flange merging at its axially inner side with a generally axially outwardly facing side flange of the tire rim and at its axially outer side with a generally radially and then axially outwardly directed terminal flange, a cover for disposition at the outer side of the wheel comprising a sheet metal cover body having an annular inwardly dished portion for overlying the junction of the tire rim and wheel body and provided with a generally radially and axially outwardly uniformly oblique margin for overlying the terminal flange and having an underturned annular flange therebehind extending radially and axially inwardly to project radially inwardly beyond juncture of the intermediate and terminal flanges, said underturned flange having extending angularly therefrom adjacent the dished portion of the cover a generally axially inwardly directed retaining flange structure comprising a plurality of axially inwardly extending radially flexibly resilient legs diverging relative to said dished annular cover portion and arranged to lie in radially inwardly spaced relation to the intermediate flange and having at the axially inner extremity thereof terminal means retainingly engageable with the intermediate flange and opposing said side flange, said legs flaring from said terminal means toward substantially greater width at juncture with said underturned flange whereby substantially to increase the resiliency of the legs and thereby resistance to radial deflection.

3. In a wheel structure including a wheel having a multi-flanged tire rim, a wheel cover for disposition at the outer side of the wheel including a circular cover member having an outer marginal turned pry-off edge structure on a radially outer marginal portion for overlying the tire rim, said radially outer marginal portion having projecting generally axially inwardly therefrom a plurality of circumferentially spaced retaining fingers each of which includes an axial leg with substantially flaring side edges and a relatively shorter and narrower inclined leg at an acute angle to said axial leg and extending generally radially outwardly over said axial leg and terminating in a rim flange gripping edge, said legs having an axially inwardly directed junction comprising a reinforcing bend for bottoming against another rim flange.

4. In a wheel structure including a tire rim having an annular generally radially inwardly facing flange and an annular generally axially outwardly facing flange joined thereto at the axially inner side of said radially inwardly facing flange, a cover for disposition at the outer side of the wheel including an outer marginal portion for overlying said flanges and having an underturned outer marginal flange having extending therefrom cover retaining means comprising a circumferentially spaced series of generally axially inwardly extending retaining fingers having axially inward legs arranged for general telescoping radially inwardly spaced disposition relative to said radially inwardly facing flange and provided at their axially inner termini with generally radially outwardly extending retaining terminals grippingly engageable with said radially inwardly facing rim flange and providing at juncture with said axially inward legs reinforcing junctions for bottoming against said axially outwardly facing flange and thereby supporting the cover with said underturned flange spaced from the tire rim in gap relation thereto whereby to enable insertion of a pry-off tool therebehind.

References Cited in the file of this patent

UNITED STATES PATENTS

| Re. 19,467 | Lyon | Feb. 12, 1935 |
|---|---|---|
| 1,800,173 | Anderson | Apr. 7, 1931 |
| 1,944,658 | Griffith | Jan. 23, 1934 |
| 2,006,639 | Horn | July 2, 1935 |
| 2,088,265 | Hulin | July 27, 1937 |
| 2,102,471 | Lyon | Dec. 14, 1937 |
| 2,162,731 | Lyon | June 20, 1939 |
| 2,162,734 | Lyon | June 20, 1939 |
| 2,239,897 | Lyon | Apr. 29, 1941 |
| 2,254,376 | Lyon | Sept. 2, 1941 |
| 2,282,588 | Lyon | May 12, 1942 |
| 2,349,738 | LeJeune | May 23, 1944 |
| 2,358,984 | Lyon | Sept. 26, 1944 |
| 2,368,228 | Lyon | Jan. 30, 1945 |
| 2,395,692 | Snow | Feb. 26, 1946 |
| 2,404,390 | Lyon | July 23, 1946 |
| 2,410,676 | Nielsen | Nov. 5, 1946 |
| 2,535,081 | Lyon | Dec. 26, 1950 |
| 2,574,491 | Lyon | Nov. 13, 1951 |
| 2,602,705 | Lyon | July 8, 1952 |
| 2,607,633 | Lyon | Aug. 19, 1952 |
| 2,633,944 | Butterfield | Apr. 7, 1953 |
| 2,669,487 | Horn | Feb. 16, 1954 |

FOREIGN PATENTS

| 357,213 | Great Britain | Sept. 14, 1931 |
|---|---|---|